US006847959B1

(12) United States Patent
Arrouye et al.

(10) Patent No.: US 6,847,959 B1
(45) Date of Patent: Jan. 25, 2005

(54) UNIVERSAL INTERFACE FOR RETRIEVAL OF INFORMATION IN A COMPUTER SYSTEM

(75) Inventors: Yan Arrouye, Cupertino, CA (US); Keith Mortensen, Sunnyvale, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/478,009

(22) Filed: Jan. 5, 2000

(51) Int. Cl.[7] .......................... G06F 17/30; G06F 17/00
(52) U.S. Cl. ............................. 707/2; 3/104.1
(58) Field of Search ................... 707/4, 3, 10, 104.1, 707/1–5; 709/201, 217; 712/215, 22, 24; 706/10–15, 46, 45; 719/316

(56) References Cited

U.S. PATENT DOCUMENTS

| | | | | |
|---|---|---|---|---|
| 5,404,295 A | * | 4/1995 | Katz et al. ..................... | 707/2 |
| 5,727,129 A | | 3/1998 | Barrett et al. | |
| 5,729,741 A | * | 3/1998 | Liaguno et al. ............. | 707/104 |
| 5,764,906 A | | 6/1998 | Edelstein et al. | |
| 5,870,755 A | * | 2/1999 | Stevens et al. ............. | 707/104 |
| 5,893,107 A | | 4/1999 | Chan et al. | |
| 5,913,205 A | * | 6/1999 | Jain et al. ..................... | 707/2 |
| 5,987,446 A | * | 11/1999 | Corey et al. ................. | 707/3 |
| 6,009,422 A | * | 12/1999 | Ciccarelli ..................... | 707/4 |
| 6,285,785 B1 | * | 9/2001 | Bellegarda et al. ......... | 382/187 |
| 6,311,178 B1 | * | 10/2001 | Bi et al. ........................ | 707/3 |
| 6,628,305 B1 | * | 9/2003 | Hong et al. .................. | 345/734 |
| 6,732,088 B1 | * | 5/2004 | Glance .......................... | 707/3 |
| 2002/0107872 A1 | * | 8/2002 | Hudis et al. ............. | 707/104.1 |

OTHER PUBLICATIONS

Chaudhuri et al "Optimizing queries over multimedia repositories", ACM 1996 pp. 91–102.*
Katayama et al "A universal query interface for heterogeneous distributed digital libraries", IEEE 1996, pp. 332–339.*
Menczer et al, "Adaptive information agents in distributed textual environments" Autonomous Agents 1998, Minneapolis MN, USA, pp. 157–164.*
Das et al, "Experiments in using agent–based retrieval from distributed and heterogeneous databases", IEEE 1997, pp. 27–35.*
Domenig et al, "An overview and classification of mediated query systems", ACM SIGMOD Record, vol. 28, No. 3, Sep. 1999, pp. 63–72.*
Pastor et al, "An architecture for intelligent resource agents", IEEE 1997, pp. 151–159.*
Jim Gray "Parallel database systems 101", ACM 1995, p. 436.*
Gary Perlman, "The FirstSearch user interface architecture: universal access for any user, in many languages, on any platform", ACM 2000, pp. 1–8.*
Dadoun et al, "Parallel processing for efficient subdivision search", ACM 1987, pp. 205–254.*
Wei Hong, "Exploiting inter–operation parallelism in XPRS", ACM 1992, pp. 19–28.*
Ganguly et al, "Efficient and accurate cost models for parallel query optimization", ACM 1996, pp. 172–181.*
Blumenfeld et al, "A uniform interface to networked library services", ACM 1992, pp. 608–613.*
Agosti et al, "Desing of OPAC database to permit different subject searching accesses in a multi–disciplines universities library catalogue database", ACM 1992, pp. 245–255.*

* cited by examiner

Primary Examiner—Uyen Le
(74) Attorney, Agent, or Firm—Burns, Doane, Swecker & Mathis, L.L.P.

(57) ABSTRACT

The present invention provides convenient access to items of information that are related to various descriptors input by a user, by means of a unitary interface which is capable of accessing information in a variety of locations, through a number of different techniques. Using a plurality of heuristic algorithms to operate upon information descriptors input by the user, the present invention locates and displays candidate items of information for selection and/or retrieval. Thus, the advantages of a search engine can be exploited, while listing only relevant object candidate items of information.

49 Claims, 3 Drawing Sheets

UNIVERSAL INTERFACE FOR RETRIEVAL OF INFORMATION IN A COMPUTER SYSTEM

BACKGROUND OF THE INVENTION

1. Field of the Invention

The present invention is directed to a computer-human interface for quickly and easily retrieving desired information in a computer system. More specifically, the present invention is directed to a universal interface which uses a plurality of heuristic algorithms to identify an item of information (e.g., document, application or Internet web page) in response to at least one information descriptor.

2. Description of the Related Art

One of the basic needs of a computer user, especially with the recent growth in the amount of data and information available via networks and the Internet, is to be able to quickly search through the available information to identify useful items, and to thereafter easily locate those items. To satisfy this need, many computer operating systems contain routines that provide a simple way to locate objects. For example, the Finder of the Macintosh® Operating System implemented by Apple Computer, Inc. includes a Find File utility which permits a user to locate various files located in the system directories (e.g., folders) using keywords that occur in the desired file's name. The Find File utility includes the ability to search on local disks and mounted servers. The Windows® operating system, implemented by Microsoft Corporation, also employs a Find mechanism that allows a user to locate files stored in the computer system. The application uses inputted search criteria to generate and display a list of possible files that satisfy the search criteria. At times however, the list can become long and cumbersome, thereby requiring the user to sift through the list and identify useful information. Accordingly, this technique may fail to significantly reduce the time and effort a user expends to identify and retrieve useful information.

As another feature for quickly retrieving items of interest, some computer systems store a list of previously used documents or applications from which they can be easily invoked. However, this feature requires the user to access a different interface element to retrieve the item, and does not provide for the use of keywords to identify the specific document or program that the user desires.

Also, with the advent of the Internet, various specialized find routines have been developed that can be loaded into a computer's memory and launched in order to facilitate user requests for particular information on servers located throughout the world. Additionally, web browser applications enable a user to access worldwide websites and interact with search engines provided by the website.

Like the Find File utility discussed above, finding information on the Internet can prove frustrating because search criteria are often too broad. For example, when a keyword is entered, thousands of different web pages containing these keywords can be displayed in a list for a user to choose from. Accordingly, additional search criteria are needed to more effectively filter information available, for example, on the world wide web. However, there is little technology currently available which allows the computer to help the user determine such additional criteria or to automatically provide additional criteria, so that search results have a higher percentage of items that are of interest to the user.

Additionally, web-browser applications are not designed to search for non-web-based documents or applications located on the computer or an associated computer network and, conversely, File Find-type utility programs are not capable of searching the Internet for web-based documents or applications. There has been no combination of desktop find routines that presents a single interface and Internet browsing routines to allow a computer user to find a needed or desired item of information from among all different types of information storage systems. Additionally, there is no program which is able to process the user's input and then determine, using many different factors, including use of the Internet, the intent of the user as to the file to be retreived. Accordingly, in order to present a more informative and personalized user interface, a unitary manner of finding a user's desired item of information is needed.

SUMMARY OF THE INVENTION

The present invention provides convenient access to items of information that are related to various descriptors input by a user, by means of a unitary interface which is capable of accessing information in a variety of locations, through a number of different techniques. Using a plurality of heuristic algorithms to operate upon information descriptors input by the user, the present invention locates and displays candidate items of information for selection and/or retrieval. Thus, the advantages of a search engine can be exploited, while listing only relevant object candidate items of information.

In accordance with an exemplary embodiment of the present invention, methods and apparatuses for locating information in a computer system are described which receive an information identifier, locate at least one item of information based upon the information identifier by means of a plurality of heuristic algorithms each having a separate location scheme, provide at least one candidate information item, and display a representation of the information item.

In accordance with another exemplary embodiment of the present invention, methods and apparatuses for locating information in a computer system are described which input an information identifier, providing the information identifier to locate information in the plurality of locations which comprise the Internet and local storage media, wherein the information located matches the information identifier when applied to a plurality of heuristics, determining at least one candidate item of information based upon the plurality of heuristics, and displaying a representation of the candidate item of information.

In yet another exemplary embodiment of the present invention, methods and apparatuses for displaying information in a computer system is described which includes inputting an information identifier, providing the information identifier to a plurality of heuristics in accordance with a global heuristic, wherein each information identifier is matched to information based upon the plurality of heuristics, receiving at least one candidate item of information based upon the information provided to the heuristics in accordance with the global heuristic, and displaying a representation of the candidate items of information.

BRIEF DESCRIPTION OF THE DRAWINGS

Other objects and advantages of the present invention will become more apparent from the following detailed description of the invention when read in conjunction with the accompanying drawings wherein like elements are designated by like numerals and wherein.

DETAILED DESCRIPTION OF THE INVENTION

The present invention will now be described with reference to the accompanying drawings describing a universal interface in which user inputs are received and provided to a plurality of separate heuristic algorithms to locate at least one item of information. It will be appreciated that the invention is not limited to only the embodiments set forth within this disclosure. Rather, the particular heuristic algorithms described herein are meant to be exemplary of many different heuristics that can be employed, for the purpose of retrieving information through a simplified user interface.

Figure 1:
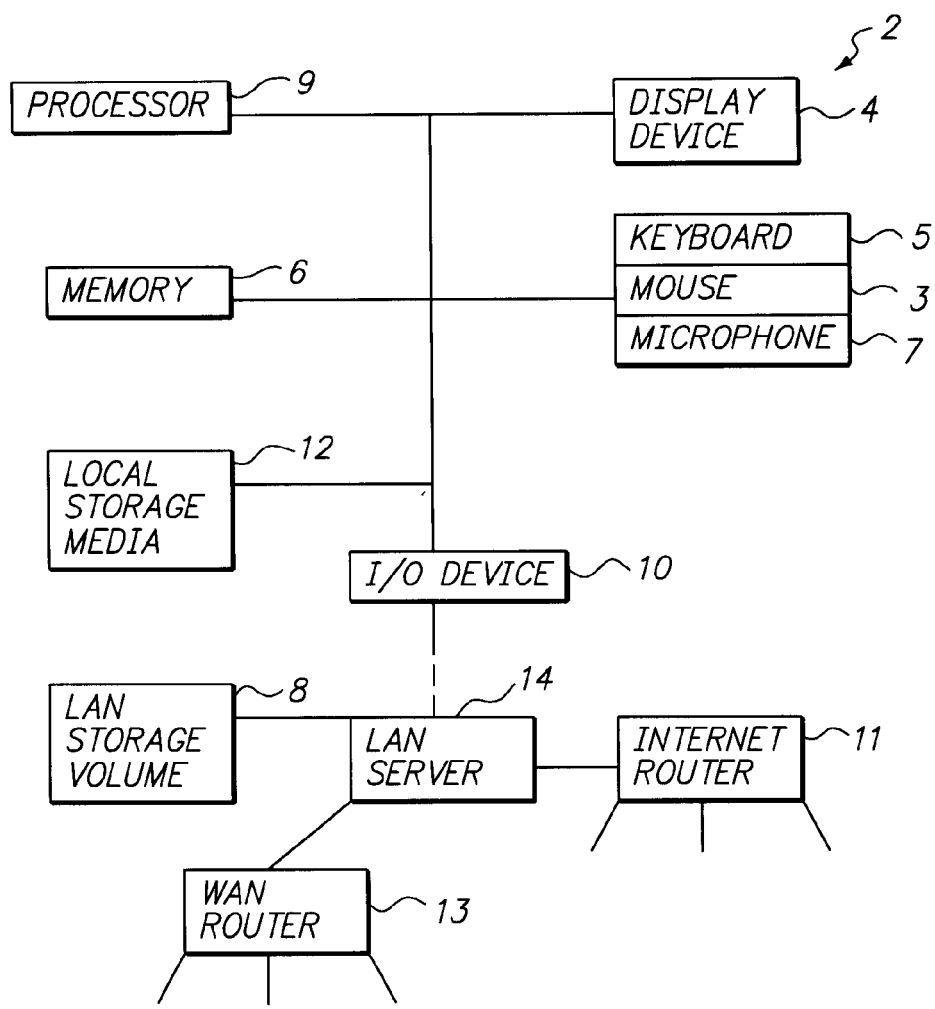
FIG. 1 illustrates the hardware components of a networked computer system of a type in which exemplary embodiments of the present invention can be implemented.

Referring to FIG. 1, a general computer system 2, in which the present invention can be implemented, is illustrated. Computer system 2 comprises a display device 4 and various input devices such as a keyboard 5, microphone 7 and mouse 3 in operable connection with a memory 6, data processor 9 and local storage media 12 which can include one or more magnetic and/or optical disk drives, for example. Additionally, the computer system 2 can be connected via an Input/Output device 10 (e.g., a modem or cable connection) to a Local Area Network (LAN) server 14. The LAN server 14 can also be connected to a LAN storage volume 8 which stores files for use on the network served by the LAN. The LAN server 14 can also include a Wide Area Network (WAN) router 13 and an Internet router 11. The WAN router and the Internet router can be connected to other servers (not shown) which access additional storage media containing files, application programs, web pages, etc. While other elements and components are normally attached to the computer system 2, only these elements are shown so as not to obscure the invention.

In general, the present invention provides a universal interface that enables the user to readily retrieve an item of desired information located on any of the various storage media that are accessible to the user's computer system, with minimal effort. The desired information could be an application that is stored on the local storage media 12, a file stored on the LAN storage volume 8, or a web page available through the Internet router 11. Rather than require a separate search mechanism to locate each of these different types of information, the present invention facilitates the user's ability to easily retrieve the information by means of a single universal interface which is capable of accessing files on all of these various storage resources.

Figure 2:
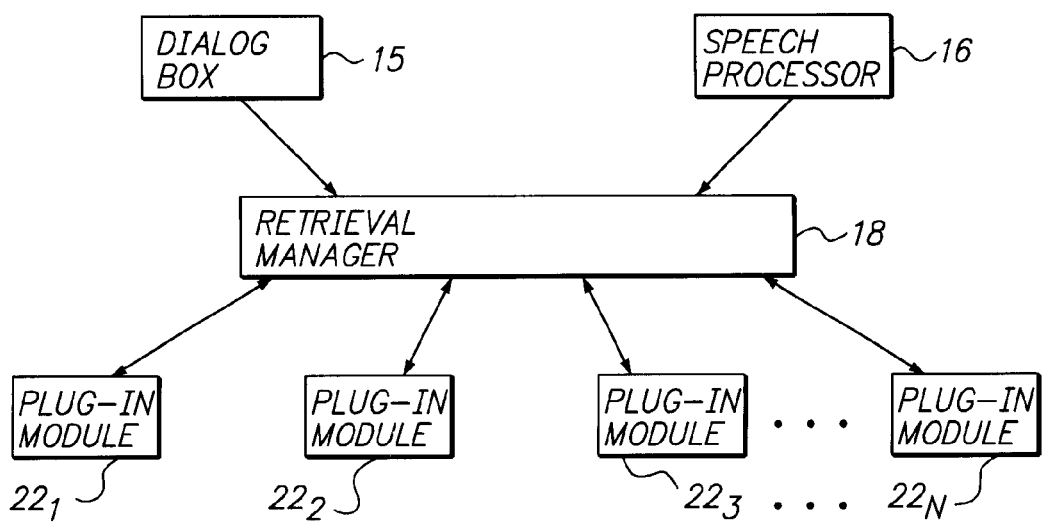
FIG. 2 illustrates the software architecture in accordance with exemplary embodiments of the present invention.

The components which provide this functionality are illustrated in the architectural block diagram of FIG. 2. In operation, the user provides input which describes the information in which the user is interested. This input could be text data that is entered in a dialog box 15 or spoken words provided to a speech processing program 16. This input is received by an information retrieval manager 18. In the case of spoken words, the speech processing program 16 first converts the speech to text, which is then presented to the information retrieval manager 18.

In response, the information retrieval manager 18 dispatches the input to a plurality of plug-in modules $22_1$–$22_N$. Each plug-in module has an associated heuristic which it employs to locate information that corresponds to the user input. For instance, one module $22_1$ may search the names of files stored on the local storage media 12 and the LAN storage volumes 8, to find those which match the user input. A second module $22_2$ may index and search the contents of files on the local and/or network storage volumes. A third module 223 can maintain a list of the files, applications and web sites which were most recently accessed, and search this list for a match. Yet another module might employ a search engine to locate Internet web pages which match the user input.

Each plug-in module $22_1$–$22_N$ attempts to locate information in a relevant area of search, using its associated heuristic. The results obtained by the modules are sent back to the retrieval manager 18. The information retrieval manager may employ additional heuristics to determine which results are most relevant, and present one or more choices to the user on the display device 4.

Figure 3A:
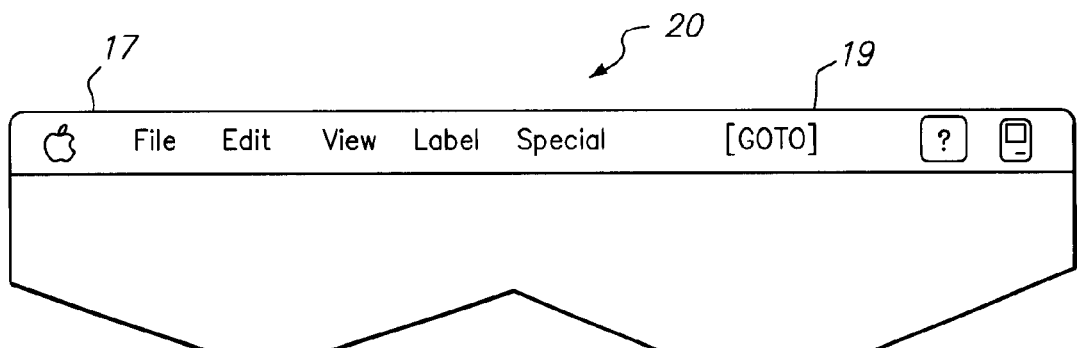
FIG. 3A illustrates a partial view of a desktop including a GO-TO menu option, in accordance with an exemplary embodiment of the present invention.

In accordance with an embodiment of the present invention, the universal interface can be implemented so as to operate constantly and in tandem with the computer's operating system. The functionality of the information retrieval interface can be accessed in several different ways. FIG. 3A illustrates a desktop display 20 that includes a graphical representation of a button 19 (entitled "GO-TO") within a menu bar 17. Also, located within the menu bar are various conventional menu items such as File, Edit, View, Label, and Special. When the button 19 located in the menu bar 17 is selected by the user, the information retrieval function of the present invention is accessed and the dialog box 15 is displayed. It should be noted that while the access to the information retrieval feature is depicted as being by way of a button located in the menu bar in FIG. 3, there are many other ways in which the interface can be accessed. For example, the interface could be represented by an icon graphically located in a desktop display, and be launched each time the user and clicks on the icon representation via the mouse 3.

Figure 3B:
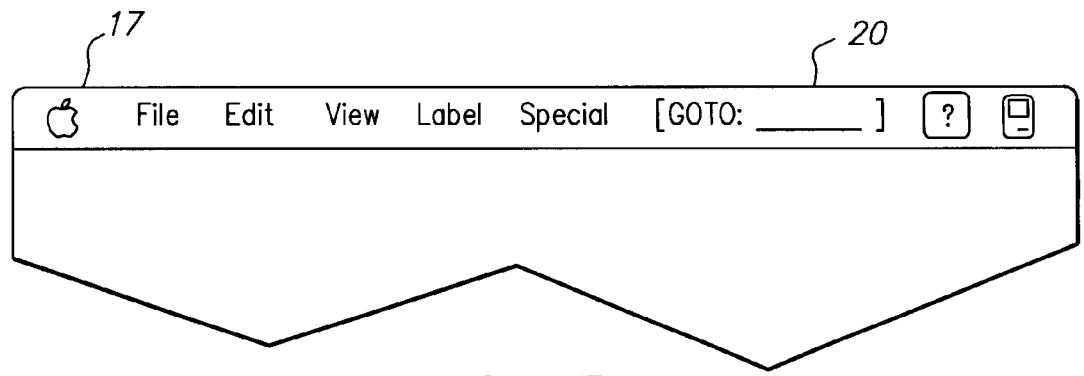
FIG. 3B illustrates a partial view of a desktop including a GO-TO menu option containing a text input window, in accordance with an exemplary embodiment of the present invention.

In another alternative embodiment illustrated in FIG. 3B, the menu bar 17 might contain a text input window itself, and the information retrieval function is accessed when the user begins to type characters in this window. More generally, the information retrieval system can operate in conjunction with any type of interface via which a user might enter a request for an item of information, by monitoring dialog boxes and other such input mechanisms, including those in individual applications. For example, if a user enters text in a browser window, the information retrieval system can provide this text to the modules to locate relevant items of information.

Figure 4:
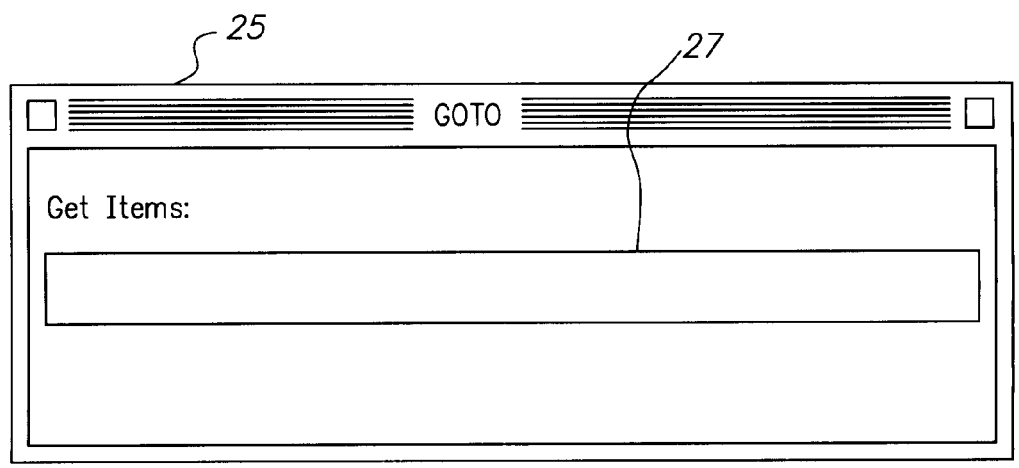
FIG. 4 illustrates an active window that is displayed when the GO-TO menu option described with respect to FIG. 3 is launched.
Figure 5:
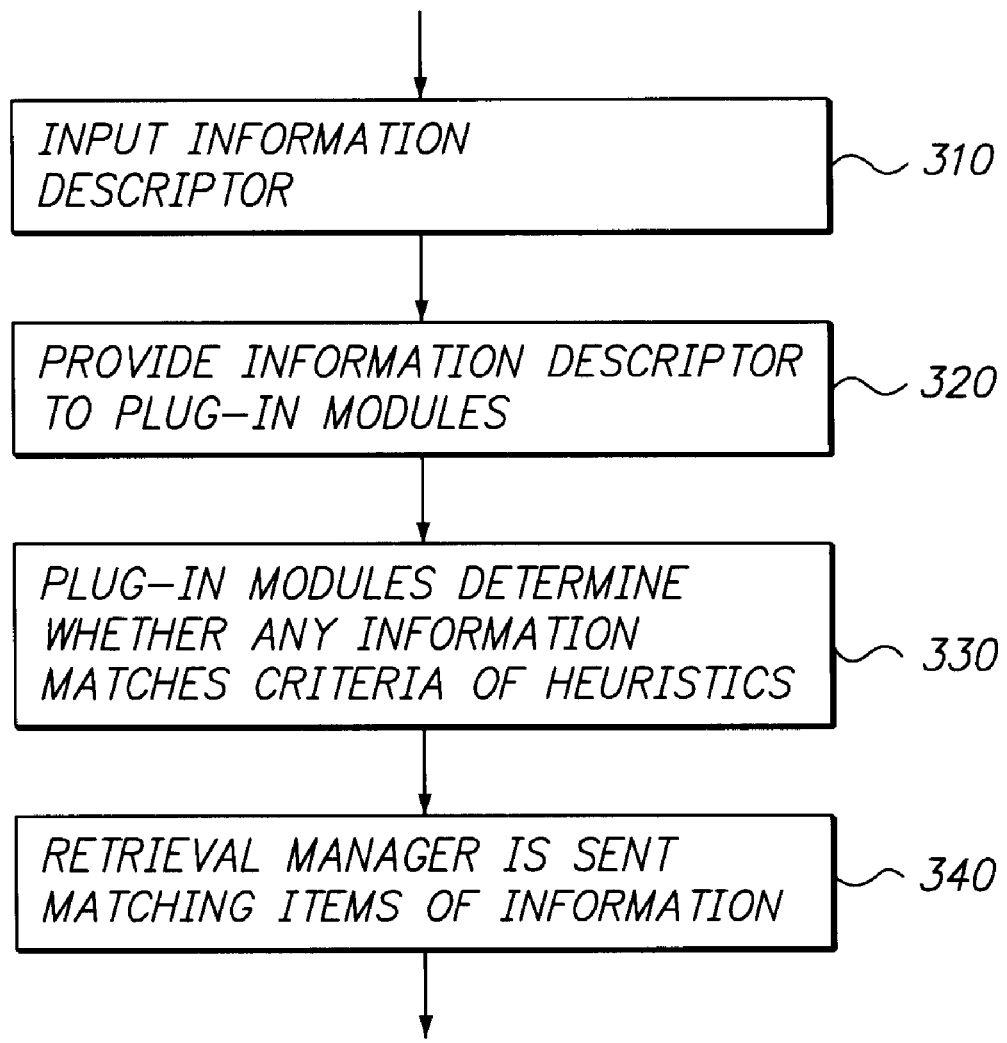
FIG. 5 illustrates a flow diagram describing the GO-TO application in accordance with an exemplary embodiment of the present invention.

When the GO-TO button 19 (illustrated in FIG. 3A) is selected by a user, the dialog box, represented by active window 25 illustrated in FIG. 4, is displayed on the desktop of display device 4. The active window 25 provides a text box 27 for the user to enter an information descriptor which comprises a letter, a series of letters, a word, a plurality of words, a phrase or sentences to be used by the retrieval manager 18, in locating information. FIG. 5 illustrates the operations that are performed in response to the user input. In step 310, the user inputs an information descriptor, either by voice input to the microphone 7 or by manual input to the keyboard 5, which is displayed in the text box 27. In step 320, once the information descriptor is provided, the information retrieval manager 18 provides the information descriptor to one or more of the plug-in modules $22_1 \ldots 22_N$, in accordance with a global heuristic, described in detail below.

In step 330, the selected plug-in modules $22_1 \ldots 22_N$ receive the information descriptor and determine whether any information matches the criteria of respective locator heuristics associated with the plug-in modules $22_1 \ldots 22_N$. The heuristic of each plug-in module is different. For example, as described previously, one heuristic can operate to match the user descriptor with the names of information located within various storage media in the computer, on servers and the Internet. Another heuristic can identify matches between the information descriptor and the content of files located on the computer, on servers and the Internet.

Additionally, heuristic algorithms can also be provided that store and review the history of information that has been recently accessed to determine which might match the descriptor. Other heuristics can employ a look-up-table to review mappings on a private network accessed either locally or remotely. Another heuristic module might review the favorite locations accessed by a browser application located on computer system 2. The URLs stored by the browser application can be searched to determine if they match the input of the user. Each plug-in module $22_1 \ldots 22_N$ might identify one item of information, a plurality of possible items of information, or no information that matches the user input, according to the module's heuristic approach.

In step 340, once a plug-in module $22_1 \ldots 22_N$ has determined that at least one item of information matches its heuristic, the information retrieval manager is notified and sent the information that matches the user input, according to that module's associated heuristic. In accordance with one embodiment of the invention, a "first to respond" approach can be employed to select an item of information to be displayed to the user. In this embodiment, the first plug-in module to notify the information retrieval manager 18 that matching information has been identified is chosen, and its matching information is displayed to the user or, if desired, automatically launched. Alternatively, the information retrieval manager 18 could rank the outputs from the plug-in modules $22_1 \ldots 22_N$ in the order their notifications are received. This would allow for more than one choice to be displayed for a user. Due to differences in communication speeds, this approach will tend to give greater priority to locally stored files than those which are located at more remote sites, such as those on an wide-area network or the Internet.

In other embodiments of the invention, different global heuristics can be employed by the information retrieval manager to determine the results that are to be provided to the user. These global heuristics can be classified into two general categories. In one category, the user input is selectively provided to the plug-in modules, and only the results from those modules are displayed to the user. For instance, all of the modules can be given a priority ranking. When user input is received, it is first provided to the module with the highest ranking. If that module responds within a certain period of time with one or more matches, those matches are displayed. However, if the module responds that it cannot find a match, or does not respond within the allotted period of time, the user input is provided to the next-highest ranking module. The procedure continues in this manner, until a module presents a match, which is then displayed to the user. As an alternative to sequentially accessing individual modules, two or more modules can be grouped at a given priority level, and be accessed in parallel when their priority level is selected.

In a further enhancement of the prioritized approach, the priority ranking of the modules can be context sensitive. For instance, if the user accesses the information retrieval system through an icon on the desktop or a system menu bar, the plug-in modules which perform searches on local storage media can be given higher priority than those which search remote sites. However, if the user enters text via a window in a browser application, it is more likely that the user desires to view a web page, and therefore the plug-in modules whose heuristics are oriented towards Internet sites are given higher priority.

In the second general category of global heuristics, the user input can be provided to most or all of the plug-in modules in parallel, and the results that are returned from each one are then processed in accordance with a given heuristic. For example, as described previously, one heuristic might function to select the first result that is returned. In another heuristic, a frequency of occurrence approach can be employed, wherein an item of information which is identified by a plurality of modules is selected in favor of one which is identified by only one module. In yet another embodiment, the results from the various modules can be weighted in accordance with various criteria, such as their relationship to the context in which the user input was received.

The global heuristic which is employed by the information retrieval manager 18 might also determine the amount of information to be presented to the user. Ideally, the various plug-in modules, through the use of confidence factors calculated for each item of information, would identify a single item of information that best fits the user's input, and only that item is presented to the user. In this case, the item can be automatically opened or launched as well. Various characteristics can be utilized in determining the confidence factors. For example, if a user input multiple words as an information descriptor, and an exact match to the input was found by a plug-in module, the confidence level could be indicated as being 100 percent. On the other hand, if only half of the words were found in an item of information, the confidence level would be less, thereby indicating that this might not be the item of information sought.

In practice, however, it is not likely that only one candidate will provide a good match, particularly if the user inputs a broad term. Accordingly, the calculation of a confidence factor associated with each item of information allows the information retrieval manager to select a relatively limited number of choices to the user, e.g. the top five candidates according to a predetermined minimum confidence level. If these choices do not include the particular item of interest, the user can further refine the input information.

Further in this regard, the information retrieval system can obtain results and display them to the user in real time as the input is being entered. In this embodiment, each keystroke or converted speech phoneme is provided to the appropriate plug-in modules as it is received by the manager 18. For instance, if the user desires to look at prior tax return information, each of the letters "T", "A" and "X" are provided to the modules as they are typed. As soon as the letter "T" is entered, sets of matching items of information are returned by the modules, and the top five candidates are displayed. Entry of the letter "A" causes the list to be updated according to the candidates which match the sequence of letters "TA". After the letter "X" is typed, the displayed list might contain the five most recent tax returns that were filed by the user. If the desired return is not in the list, the user can continue by entering the year of the desired return, or other identifying information, until such time as the item of interest is displayed.

It will be appreciated that this embodiment, in which the displayed items are dynamically updated in real time, is best suited for the retrieval of locally stored information, where communication rates are relatively fast. For access to remotely stored information, it may be more appropriate to wait until the user presses a space key or an "Enter" key before supplying the input to the modules 22, so that the retrieval is carried out on the basis of whole words or complete phrases.

Accordingly, the present invention provides swift access to information or a list of information that is related to various descriptors input by a user. Using the heuristic analysis combined with user input, the present invention is able to present to a user a manageable amount of information candidates for selection. Thus, the advantages of a search engine can be exploited, and information candidates can be retrieved in a reasonable amount of time.

A particular advantage to the use of plug-in modules to implement the various retrieval heuristics is the fact that it readily lends itself to expansion and adaptability to the user's environment. For instance, the computer's operating system may contain a few plug-in modules that operate according to the most popular heuristics. Other plug-in modules may be developed by various entities to operate according to types of information which they supply. Thus, if a search engine is designed for use on the Internet to locate particular types of web pages, a plug-in module can also be designed to access that search engine and return results to the information retrieval manager. As other techniques are developed for locating information, they can also be embodied in appropriate plug-in modules, to thereby enhance the user's ability to obtain relevant items of interest.

It will be appreciated by those of ordinary skill in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalence thereof are intended to be embraced therein.

What is claimed is:

1. A method for locating information in a computer system, comprising the steps of:
   inputting an information identifier;
   providing said information identifier to a plurality of plug-in modules each using a different heuristic to locate information which matches said identifier;
   providing at least one candidate item of information from said modules; and
   displaying a representation of said candidate item of information.

2. The method of claim 1 wherein said information identifier is input via an application program having a text input window.

3. The method of claim 1 wherein said information identifier is input in by means of a dialog box displayed on a user interface.

4. The method of claim 1 wherein said information identifier is vocally entered by a user.

5. The method of claim 1 wherein said information identifier is one of a letter, a word, or a phrase.

6. The method of claim 1 wherein said information identifier is sequentially provided to said modules until one of said modules provides a candidate item of information.

7. The method of claim 6 wherein said modules are ranked in an order of priority, and said information identifier is sequentially provided to said modules in accordance with said ranking.

8. The method of claim 7 further including the steps of determining a context for the input of the information identifier, and varying said ranking in accordance with the determined context.

9. The method of claim 1 wherein one of said heuristics locates items of information on the basis of names of files.

10. The method of claim 9 wherein another of said heuristics locates items of information on the basis of contents of files.

11. The method of claim 9 wherein another of said heuristics locates items of information on the basis of most recently accessed items.

12. The method of claim 1 wherein one of said heuristics locates items of information that are stored locally on the computer system.

13. The method of claim 12 wherein said one heuristic also locates items of information that are stored on a local-area network to which the computer system is connected.

14. The method of claim 12 wherein another of said heuristics locates items of information that are stored on remote computer systems.

15. The method of claim 14 wherein said other heuristic locates Internet web pages.

16. The method of claim 14 wherein said other heuristic locates items of information that are stored on a wide-area network.

17. The method of claim 1 wherein said information identifier is provided in parallel to said modules, and further including the step of selecting candidate items of information provided by said modules for display in accordance with a global heuristic.

18. The method of claim 1 wherein each candidate item of information has an associated confidence level.

19. A method for locating information from a plurality of locations in a computer system, comprising the steps of:
   inputting an information identifier;
   providing said information identifier to a plurality of heuristics to locate information in a plurality of locations which include the Internet and local storage media;
   determining at least one candidate item of information based upon the plurality of heuristics; and displaying a representation of said candidate item of information.

20. The method of claim 19, wherein the information identifier is applied separately to each heuristic.

21. The method of claim 19 wherein the plurality of heuristics are ranked in an order of priority and wherein the information identifier is sequentially provided in accordance with the ranking.

22. The method of claim 19 wherein one of the plurality of heuristics locates items of information on the basis of names of files.

23. The method of claim 22 wherein another of the heuristics locates items of information on the basis of contents of files.

24. A computer readable medium for locating information from a plurality of locations containing program instructions to:
 receive an information identifier;
 provide said information identifier to a plurality of heuristics to locate information in the plurality of locations which include the Internet and local storage media;
 determine at least one candidate item of information based upon the plurality of heuristics; and
 display a representation of said candidate item of information.

25. The computer readable medium of claim 24, wherein the information identifier is applied separately to each heuristic.

26. The computer readable medium of claim 24 wherein the plurality of heuristics are ranked in an order of priority and wherein the information identifier is sequentially provided in accordance with the ranking.

27. The computer readable medium of claim 24 wherein one of the plurality of heuristics locates items of information on the basis of names of files.

28. The computer readable medium of claim 24 wherein another of the heuristics locates items of information on the basis of contents of files.

29. An apparatus that locates information from a plurality of locations within a computer system, comprising:
 means for inputting an information identifier;
 means for providing said information identifier to a plurality of heuristics to locate information in the plurality of locations which comprise the Internet and local storage media;
 means for determining at least one candidate item of information based upon the plurality of heuristics; and
 means for displaying a representation of said candidate item of information.

30. The apparatus of claim 29, wherein the information identifier is applied separately to each heuristic.

31. The apparatus of claim 29 wherein the plurality of heuristics are ranked in an order of priority and wherein the information identifier is sequentially provided in accordance with the ranking.

32. The apparatus of claim 29 wherein one of the plurality of heuristics locates items of information on the basis of names of files.

33. The apparatus of claim 29 wherein another of the heuristics locates items of information on the basis of contents of files.

34. A method for displaying information in a computer system, comprising the steps of:
 inputting an information identifier;
 selectively providing the information identifier to a plurality of heuristics in accordance with a global heuristic, wherein the information identifier is matched to information based upon the plurality of heuristics;
 receiving at least one candidate item of information based upon the information provided to the heuristics in accordance with the global heuristic; and
 displaying a representation of the candidate items of information.

35. The method of claim 34 wherein the global heuristic determines an order in which the information identifier is provided to the heuristics.

36. The method of claim 35 wherein the order is a ranking of the plurality of heuristics according to a context in which the information was input.

37. The method of claim 34 wherein the information is located over a plurality of locations which comprise at least two of the following: local storage media, a LAN storage volume, a wide area network and an Internet network.

38. An apparatus for displaying information in a computer system, comprising:
 means for inputting an information identifier;
 means for selectively providing the information identifier to a plurality of heuristics in accordance with a global heuristic, wherein the information identifier is matched to information based upon the plurality of heuristics;
 means for receiving at least one candidate item of information based upon the information provided to the heuristics in accordance with the global heuristic; and
 means for displaying a representation of the candidate items of information.

39. The apparatus of claim 38 wherein the global heuristic determines an order in which the information identifier is provided to the heuristics.

40. The apparatus of claim 39 wherein the order is a ranking of the plurality of heuristics according to a context in which the information was input.

41. The apparatus of claim 38 wherein the information is located over a plurality of locations which comprise at least two of the following: local storage media, a LAN storage volume, a wide area network and an Internet network.

42. A method for displaying information in a computer system, comprising the steps of:
 inputting an information identifier;
 providing the information identifier to a plurality of plug-in modules in accordance with a global heuristic, wherein the information identifier is matched to information by the plug-in modules based upon the plurality of heuristics;
 receiving at least one candidate item of information based upon the information provided to the heuristics in accordance with the global heuristic; and
 displaying a representation of the candidate items of information.

43. The method of claim 42 wherein the global heuristic determines an order in which the information identifier is provided to the heuristics.

44. The method of claim 43 wherein the order is a ranking of the plurality of heuristics according to a context in which the information was input.

45. The method of claim 42 wherein the information is located over a plurality of locations which comprise at least two of the following: local storage media, a LAN storage volume, a wide area network and an Internet network.

46. An apparatus for displaying information in a computer system, comprising:

means for inputting an information identifier;

means for providing the information identifier to a plurality of plug-in modules in accordance with a global heuristic, wherein the information identifier is matched to information by the plug-in modules based upon a plurality of heuristics;

means for receiving at least one candidate item of information based upon the information provided to the heuristics in accordance with the global heuristic; and means for displaying a representation of the candidate items of information.

47. The method of claim 46 wherein the global heuristic determines an order in which the information identifier is provided to the heuristics.

48. The method of claim 47 wherein the order is a ranking of the plurality of heuristics according to a context in which the information was input.

49. The method of claim 46 wherein the information is located over a plurality of locations which comprise at least two of the following: local storage media, a LAN storage volume, a wide area network and an Internet network.

* * * * *